Nov. 26, 1957  R. W. DONOHOE  2,814,203
PRESSURE-SENSITIVE INDICATING DEVICE
Filed Nov. 3, 1954
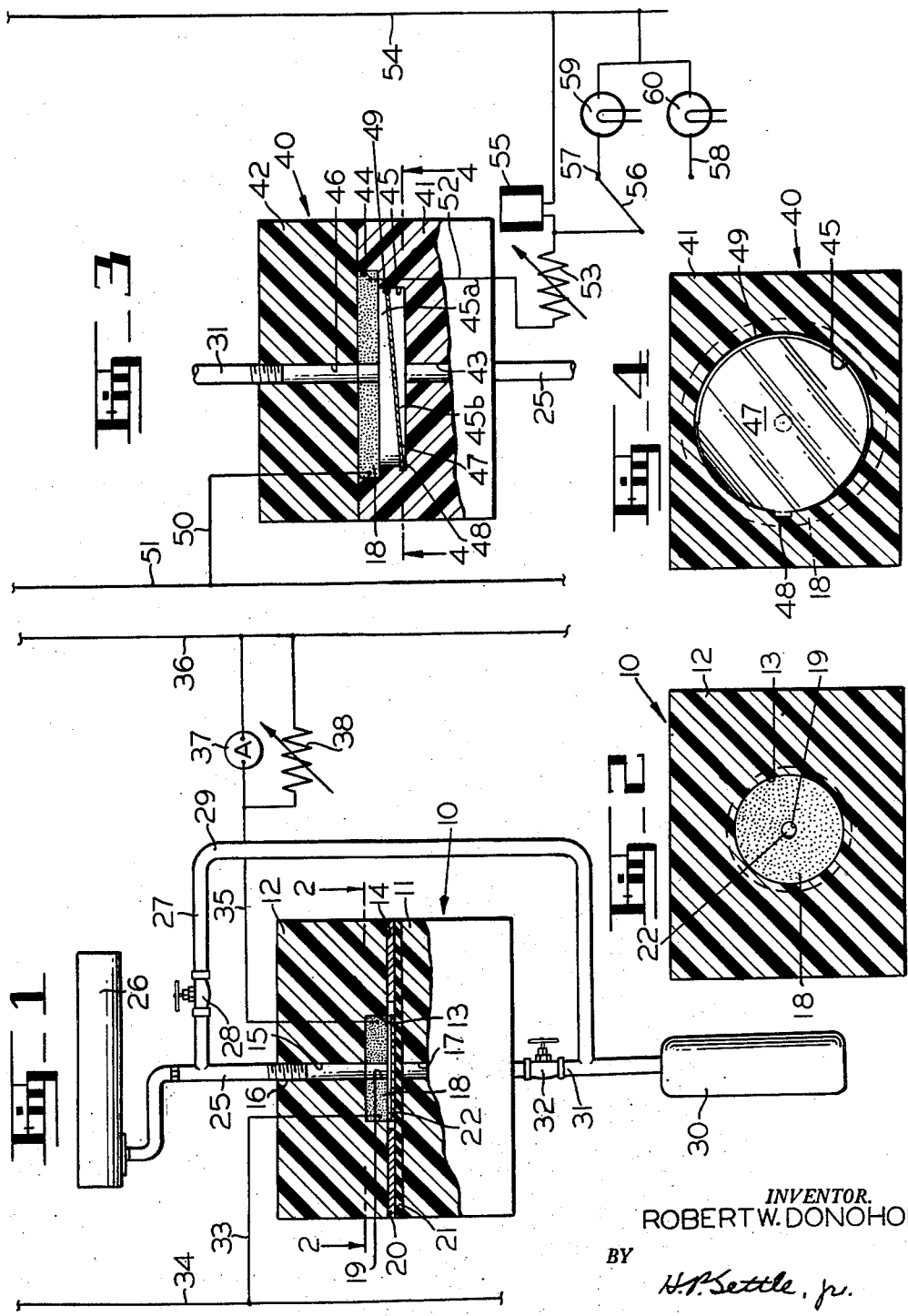
INVENTOR.
ROBERT W. DONOHOE
BY
H. P. Settle, Jr.
ATTORNEY

2,814,203

PRESSURE-SENSITIVE INDICATING DEVICE

Robert W. Donohoe, Royal Oak, Mich.

Application November 3, 1954, Serial No. 466,477

6 Claims. (Cl. 73—398)

The present invention relates to a pressure-sensitive indicating device, and more particularly to a device for determining differential pressure values by the measurement of the current flow thru a circuit including a resistance which is selectively bypassed through a conductor in direct proportion to the pressure differences.

While the device of the present invention is adapted for the determination of differential pressure values generally, it finds particular utility in the testing of castings, and other articles of like nature to determine the porosity or leakage thereof. For example, cylinder head castings for internal combustion engines are normally tested for porosity prior to the machining of the castings to final shape and size. Prior testing devices for such articles were of large size and were quite expensive due to the use of pressure-sensitive micro-switches and the like which required complicated pneumatic circuits, diaphragms and the like. Further, such prior devices were difficult to manufacture, calibrate, and maintain in proper working order.

The device of the present invention provides a novel testing device which is simple and inexpensive, and which is easily calibrated and requires no maintenance during use. Basically, the present invention comprises a combined resistance and conductor unit capable of transmitting current to a detection device in accordance with the pressure to which the combined units are subjected and means for varying the pressure on the combined unit.

In a preferred embodiment of the present invention, the resistance element takes the form of a graphite compact consisting of powdered graphite intermixed with a binder, and the pressure varying means is a fluid pressure displacable member having electrically conducting abutment means movable therewith into contact with the compact, the compact and the abutment means being urged into contact at a pressure proportional to the differential fluid pressures operatively imposed upon the displacable member. As a detection device, a suitable current-responsive mechanism may be utilized, for example an ammeter or a voltmeter, or a solenoid-actuated multiple lamp panel or buzzer assembly may be used to give a visual or audible indication of the amount of current flow thru the circuit. The compact acts as a resistance in the circuit, and the conductive abutment means serves to by-pass a portion of the current around the compact. The proportion of the current bypassed thru the abutment means is determined by the pressure urging the compact and abutment means into contact, since the resistance is directly in the circuit and the degree of surface contact between the resistance and the abutment means determines the extent of current flow through the abutment means rather than through the resistance. Thus, the greater the differential in pressure, the greater the current flow thru the conductive means and the less the current loss in the resistance.

It is, therefore, an important object of the present invention to provide an improved pressure-sensitive testing device.

Another important object of the present invention is the provision of a device for determining differential fluid pressure values by utilizing a differential pressure to urge a conductive material into contact with an electrical resistance material and measuring the current flow through the combined materials.

It is further object to provide a pressure-sensitive testing device including an electrical resistance unit, a conductive element, means for urging the resistance unit and the conductive element into contact under differential fluid pressure, and a detection unit for determining the variation in effective resistance within the device as a whole as the same is subjected to the differential pressure.

Still another object is the provision of a pressure-sensitive device for the determination of porosity of a work piece, including a source of fluid under pressure, an electrically conductive fluid pressure displaceable element subject to the differential in pressure between fluid pressure from the source and the fluid pressure in the work piece, a graphite compact disposed with respect to the element to receive the element thereagainst as the element is displaced under the influence of the differential pressure, and an electric circuit including the compact, the element and a current-responsive device adapted to indicate the current change within the circuit.

On the drawings:

Figure 1 is a somewhat schematic representation of a pressure-sensitive indicating device of the present invention;

Figure 2 is a sectional view taken along the plane 2—2 of Figure 1;

Figure 3 is a view similar to Figure 1, illustrating a modified form of the present invention; and Figure 4 is a sectional view taken along the plane 4—4 of Figure 3.

As shown in the drawings, reference numeral 10 in Figure 1 refers generally to a casing or the like formed of a suitable electrical insulating material, such as a methyl-methacrylate resin, phenol-formaldehyde resin, or the like, and composed of two half sections 11 and 12. The upper half section 12 is provided with a circular recess 13 opening onto the inner face 14 thereof and with a vertically extending port 15 interiorly threaded at its upper end, as at 16. The lower half section 11 is likewise provided with a vertical port 17 also threaded at its outer end.

Disposed within the recess 13 of the half section 12 is a compact 18 of powdered graphite mixed with a suitable binding material, such as methyl-methacrylate or the like, having a central aperture 19 of the same diameter as and registering with the port 15.

Interposed between the casing sections 11 and 12 and bonded firmly to the upper section 12 in pneumatically tight assembly therewith is an annular spacer 20, formed of metal shim stock or the like. Interposed between the spacer 20 and the lower casing section 11 and bonded to the annular spacer and the corresponding annular portion of the casing section 11 is a flexibly distortable diaphragm 21 bearing at the center thereof a circular, electrically conductive, preferably metallic disc 22 projecting into the annus of the spacer 20 and adapted to abut the compact 18 when the diaphragm 21 is distorted toward the compact. The spacer 20 is of a thickness greater than that of the disc 22, so the disc 22 is normally out of contact with the compact 18.

Threaded into the upper end 16 of the port 15 is a pipe 25 connecting the port 15 to a work piece 26 in fluid communication with an interior cavity thereof (not shown) and the porosity of which is to be determined. An elbow 27 of pipe 26 is connected to a fluid flow shutoff valve 28 interposed in a pipe 29 connected to a source of fluid pressure, such as fluid cylinder 30. The cylinder 30 also is connected through pipe 31 and shut-off valve 32 to port 17 leading to the underside of diaphragm 21.

The compact 18 is incorporated in an electrical circuit including a line 33 joining one side of the compact 18 to one conductor 34 of a standard alternating or direct current source. The other side of the compact 18 is connected to a conductor 35 joined to the other conductor 36 of the current source. An ammeter 37 is interposed in line 35 to measure the current flow between the conductors 34—36 and thru the compact 18. A variable resistance 38 is provided as a bypass around the ammeter 37, thereby affording means for readily calibrating or adjusting zero upon the ammeter 37.

This device operates, in accordance with the principles hereinbefore set forth, to determine the differential pressures acting upon the diaphragm 21. This, in turn, is a measure of the porosity of the work piece 26.

More specifically, to determine the porosity of the article 26, valve 28 is opened and valve 32 is closed, thus filling the work piece 26 with fluid, preferably air, from the source 30. At this time, the resistance 38 is manipulated to place the reading of ammeter 37 at zero. Next, valve 28 is closed to trap the air in the article 26, and the valve 32 is opened. Thus, the upper surface of diaphragm 21 is subject to the air pressure of the article, while the under surface of the diaphragm 21 is subject to the air pressure of the source 30. If there is any leakage of air from the article 26, there will be a decrease in the air pressure on the upper side of the diaphragm and the greater air pressure upon the diaphragm undersurface will displace the diaphragm 21 upwardly to bring the abutment 22 into contact with the compact 18.

The degree of current flow through the device, as measured by the ammeter 37, is dependent upon the resistance in the circuit, and further, the resistance in the circuit is dependent upon the amount of current being bypassed thru the abutment 22. The amount of current flow thru the abutment 22 is determined by the differential pressures urging the abutment into contact with the compact. Thus, it will be readily understood that the ammeter reading will accurately reflect the differential pressures acting upon the diaphragm 21. Inasmuch as the pressure of the source 30 remains constant, any variations in the differential pressure will be due entirely to the porosity of the article 26. Therefore, the ammeter 37 affords an accurate, readily discernible means for indicating the porosity of the article.

In the modified form of the invention shown in Figures 3 and 4, the arrangement of parts is generally similar to that shown in Figures 1 and 2, hereinbefore described, and similar reference numerals refer to identical parts. The primary changes in the modified form are effected in the pressure sensitive unit 40 and in the indicating circuit associated therewith.

The unit 40 comprises lower and upper sections 41 and 42, respectively. The upper section 42 is merely a rectangular block, generally similar to the section 11 of the earlier described unit 10, and is provided with a vertical port 46 in fluid communication with pipe 31 connectible to an article to be tested (not shown) and to the source of fluid pressure (not shown), as in Figure 1.

The lower section 42 is provided with a pair of stepped recesses 44 and 45 respectively, the recess 44 receiving a compact 18, similar to the compact 18 heretofore described, and the recess 45 being in fluid communication with a port 43 connected to a pipe 25 connectible thru a valve (not shown) to the source of fluid pressure. The recess 45 is traversed by a fluid pressure displacable valve 47 formed of fluid impermeable, electrically conductive inherently resilient material and secured at one marginal portion, as at 48, within the recess to normally extend diagonally thereacross. The valve 47 is provided, along its non-secured edges, with a deflectible seal 49 formed of rubber or the like, so that the valve 47 effectively divides the recess 45 into two isolated, fluid-tight compartments 45a and 45b.

The compact 18 is connected through a lead line 50 to one side 51 of a current source and thru a second lead line 52 to a variable resistance 53 interposed between the compact 18 and the other side 54 of the current source. A relay coil 55 is provided in the circuit between the resistance 53 and the line 54. The relay armature 56 is movable upon energization of the coil 55 from one contact point 57 to a second contact 58, the contact 57 being joined to the line 54 through an incandescent bulb 59, and the second contact being in circuit with line 54 through a second bulb 60.

The operation of the second embodiment is substantially the same as that earlier described, the valve 47 being displaced upwardly against the compact 18 if a pressure drop occurs in the chamber 45a because of leakage through the article being tested. The resistance 53 is varied so that current flow through the compact with the valve in its position of Figure 3 is insufficient to actuate the relay. As pressure upon the compact increases, due to upward displacement of the valve 47, sufficient current will flow through the coil 55 to move the armature from the contact 57 to the contact 58. Thus, a visual indication is provided in the event of sufficient leakage through the test article to effect actuation of the relay.

It will be seen that the present invention provides an extremely simple, inexpensive, and easily calibrated apparatus for determining the relative fluid pressures acting upon opposite sides of a fluid pressure displaceable element. Although the device is widely applicable for a variety of uses, it has been particularly described for use with a porosity determination device.

I claim:

1. In a mechanism for determining the porosity of an article and including a source of fluid pressure and means for filling said article with fluid from said source, the improvements which comprise a fluid pressure displaceable electrically conductive element, means for subjecting one side of said element to the pressure of said source and for subjecting an opposite side of said element to the pressure of fluid from said article, said means including a casing defining an interior fluid pressure chamber divided into two sections to said source and to said article, respectively, a body of graphite disposed adjacent said displaceable element on the article pressure side thereof, said body being contacted by said element and said element being urged against the body under the differential pressure of said source and said article when said element is displaced, means for passing an electric current through said body, and current flow responsive means for measuring the current drop across the graphite body as the current is bypassed through said element, thereby determining the pressure to which said body is subjected.

2. A fluid pressure indicating device for detecting pressure differentials between a source of known pressure and a different pressure, which comprises a casing having an interior chamber vented to said source and to said different pressure, respectively, a fluid pressure displaceable electrically conductive member in said chamber and dividing the same into two sections, the opposing sides of said member being subjected to said pressures respectively, a compact of powdered graphite disposed on that side of said member toward which said member will normally be displaced and adapted to receive said member thereagainst, an electric circuit including said compact as a resistance, the effective resistance of the circuit varying in accordance with the contact pressure between said member and said compact which causes the bypassing of current through said member, and current flow actuatable means in said circuit.

3. In a pressure sensitive indicating device having a fluid impermeable casing and a fluid chamber in the interior of said casing, the improvement of a pressure-sensitive device, the electrical resistance of which varies proportionately to the pressure applied thereto, disposed within said casing and comprising an electrical resistance, a fluid pressure displaceable electrically conductive abutment member disposed within said chamber in normally spaced but contactable relation to said resistance, means for subjecting said abutment member to counteracting different pressures tending to displace said abutment member into contact with said resistance to short the resistance thru the abutment member, and an electric circuit including said resistance and means for indicating the variations in current flow in the circuit as the resistance is progressively shorted by said conductive abutment member.

4. A pressure-sensitive indicating device comprising a graphite compact, an electric circuit including said compact as a resistance, a source of electric current and a current-flow responsive means, electrically conductive abutment means contactible with said compact to short out the resistance, and fluid pressure displaceable means for varying the degree of surface contact between said abutment means and said compact and therefore the amount of resistance in the circuit in proportion to the pressure difference between a known pressure and an unknown pressure, thereby varying the current flowing thru the circuit and said current-flow responsive means.

5. A pressure-sensitive indicating device comprising a casing having two sections cooperably defining an interior recess, a graphite compact disposed in said recess, a fluid pressure displaceable diaphragm, interposed between said sections and disposed in said recess to divide the interior thereof into a pair of fluid pressure chambers adapted to be subjected to different pressures, a metal disc carried by said diaphragm for surface contact with said compact and an electric circuit including said compact as a resistance, the effective resistance in said circuit varying as the compact is shorted out by said disc contacting the same under the different pressures in said chambers.

6. A pressure-sensitive device for comparing a known pressure with an unknown but generally lesser pressure, comprising a pair of casing sections enclosing an interior recess, a fluid impermeable diaphragm clamped by said sections to bridge the recess for dividing the recess into a first part subjected to a known pressure and into a second part subjected to the unknown pressure, a graphite compact disposed in the second recess part, a metal abutment carried by said diaphragm on the compact side thereof, and an electric circuit including said compact as a resistance therein, contact of the abutment with the compact in proportion to the difference between said known and said unknown pressures shorting out said resistance proportionally.

References Cited in the file of this patent

UNITED STATES PATENTS

| | | |
|---|---|---|
| 1,568,140 | Edge et al. | Jan. 5, 1926 |
| 1,720,934 | Toleik | July 16, 1929 |
| 1,933,322 | Fagan | Oct. 31, 1933 |
| 2,406,181 | Wiegand | Aug. 20, 1946 |
| 2,509,421 | Carter | May 30, 1950 |
| 2,566,369 | Putman | Sept. 4, 1951 |
| 2,641,131 | Waugh | June 9, 1953 |
| 2,642,739 | Gomez-Diez | June 23, 1953 |
| 2,701,960 | Irwin | Feb. 15, 1955 |